(12) United States Patent
Fujiwara et al.

(10) Patent No.: US 6,257,627 B1
(45) Date of Patent: Jul. 10, 2001

(54) TUBE CONNECTABLE TO PIPE

(75) Inventors: Tatsuya Fujiwara, Chigasaki; Kazumasa Kurihara, Fujisawa, both of (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/525,118

(22) Filed: Mar. 14, 2000

(30) Foreign Application Priority Data

Mar. 24, 1999 (JP) .................................................. 11-079188

(51) Int. Cl.$^7$ .................................................. F16L 37/084
(52) U.S. Cl. ............................................ 285/305; 285/921
(58) Field of Search .................................. 285/921, 305, 285/382

(56) References Cited

U.S. PATENT DOCUMENTS

| | | | |
|---|---|---|---|
| 3,785,682 | * | 1/1974 | Schaller et al. ...................... 285/921 |
| 3,825,288 | * | 7/1974 | Maroschak ............................ 285/921 |
| 3,897,090 | * | 7/1975 | Maroschak ............................ 285/921 |
| 3,899,198 | * | 8/1975 | Maroschak ............................ 285/921 |
| 3,958,425 | * | 5/1976 | Maroschak ............................ 285/921 |
| 3,990,727 | * | 11/1976 | Gallagher ............................ 285/921 |
| 4,907,663 | * | 3/1990 | Maier .................................. 285/921 |
| 4,969,670 | * | 11/1990 | Bonnema et al. .................... 285/921 |
| 5,040,729 | * | 8/1991 | Carrozza .............................. 285/921 |
| 5,094,482 | * | 3/1992 | Petty .................................... 285/921 |
| 5,213,376 | * | 5/1993 | Szabo .................................. 285/921 |

FOREIGN PATENT DOCUMENTS

| | | | |
|---|---|---|---|
| 667506 | * | 10/1988 | (CH) ................................... 285/921 |
| 4310628 | * | 10/1993 | (DE) ................................... 285/921 |
| 4305609 | * | 11/1993 | (DE) ................................... 285/921 |
| 545598 | * | 6/1993 | (EP) ................................... 285/921 |

* cited by examiner

Primary Examiner—Eric K. Nicholson
(74) Attorney, Agent, or Firm—Kanesaka & Takeuchi

(57) ABSTRACT

A tube to be connected to a pipe is formed of a base portion, a wide portion and a narrow portion integrally molded together. The wide portion has an inner end extending to the base portion, and an opening formed at a side opposite to the inner end. An inner diameter of the wide portion is greater than that of the base portion. When the pipe is inserted, the base portion receives an insertion portion of the pipe, while the wide portion receives a projecting portion of the pipe therein. The narrow portion deformably projects inwardly from an inner circumference of the wide portion at a position away from the inner end. The narrower portion allows the projecting portion to pass therethrough in a pipe inserting direction by deformation thereof, and prevents the projecting portion from passing therethrough in a pipe removing direction opposite to the pipe inserting direction.

7 Claims, 5 Drawing Sheets

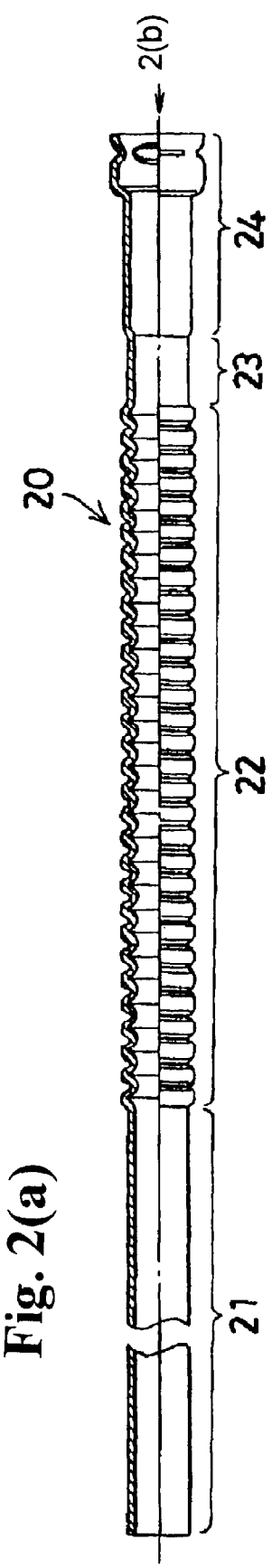

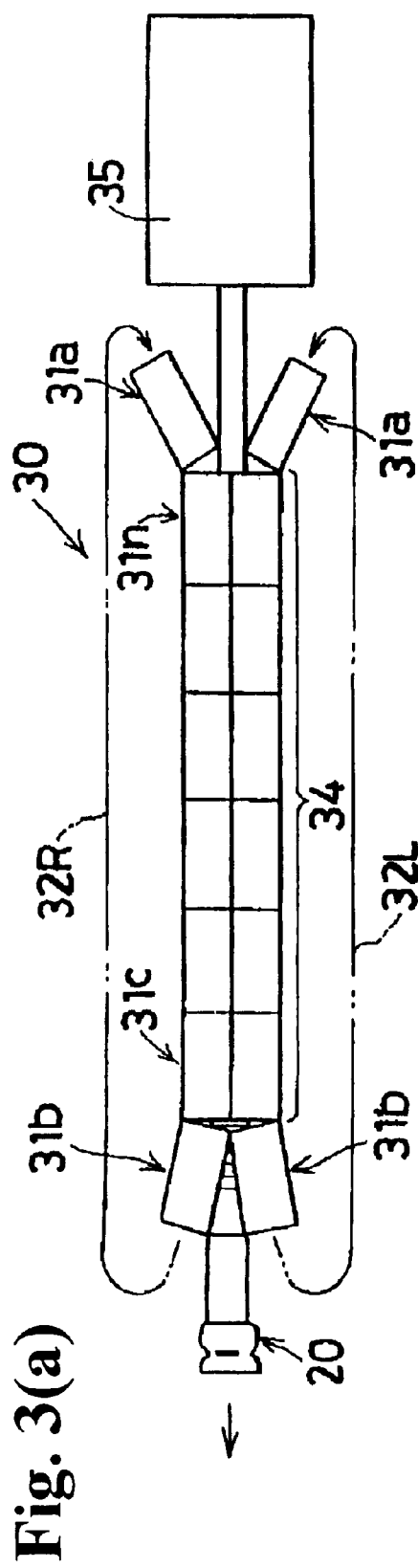
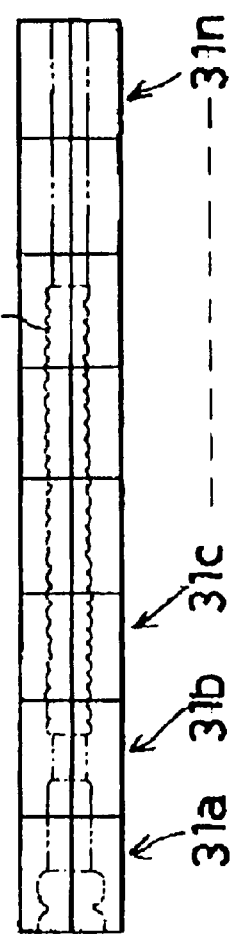
Fig. 3(a)
Fig. 3(b)

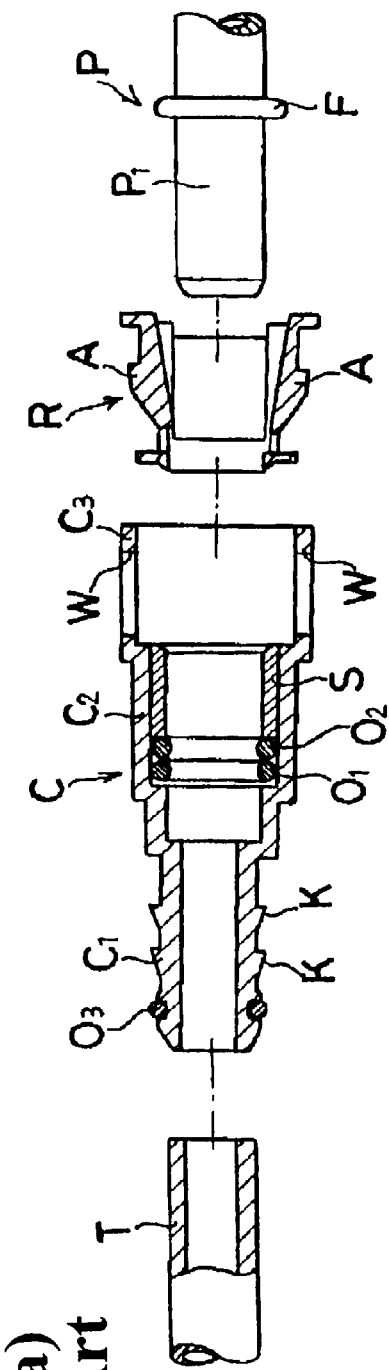
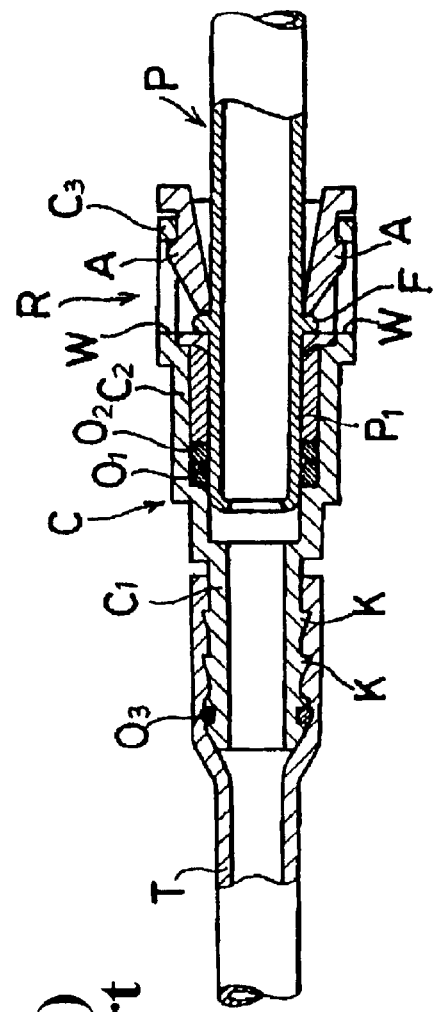
Fig. 5(a) Prior Art
Fig. 5(b) Prior Art

TUBE CONNECTABLE TO PIPE

BACKGROUND OF THE INVENTION AND RELATED ART STATEMENT

The invention relates to a tube to be connected to a pipe having a projecting portion at an insertion end portion, more particularly, an improvement of a connecting structure of the tube to be connected to the pipe.

Heretofore, a connector for connecting a pipe made of a, relatively hard material, such as steel, and a tube made of a relatively soft material, such as synthetic resin, has been, disclosed in, for example, Japanese Patent Publication (KOKAI) No. 5-196184.

The conventional connector, as shown in FIGS. 5(a) and 5(b), connects a tube T having a uniform outer diameter, to a pipe P having an insertion end portion P1 with a uniform outer diameter and a flange portion F on a circumference of the insertion end portion P1. The connector includes a connector main portion C and a retainer R.

The connector C is formed of a mounting portion C1, a base portion C2 and an attaching portion C3, which are integrally molded. The mounting portion C1 has a cylindrical shape with a small diameter and a plurality of annular projections K of a hook shape on its outer circumferential surface. The base portion C2 has a cylindrical shape of a sufficiently larger diameter than the insertion end portion P1 of the pipe P, and houses therein a pair of O-rings 01, 02, and a spacer S. The attaching portion C3 has a cylindrical shape of a diameter larger than that of the base portion C2, and is provided with a pair of windows W at mutually facing portions. The connector main portion C is attached to the tube T by inserting the mounting portion C1 into an opening end portion of the tube T.

The retainer R has a pair of openable elastic tongues A, and is attached to the attaching portion C3 such that the tongues A are fitted in the respective windows W. The elastic tongues A are gradually inclined inwardly toward the base portion C2 of the connector main portion C to thereby form a space smaller than an outer diameter of the flange portion F between the forward ends thereof.

In the conventional technique, when the pipe P is inserted into the connector main portion C, the elastic tongues A are pressed in a direction radially outwardly by the flange portion F, so that the elastic tongues A are suitably widened to thereby allow the flange portion F to pass therethrough. Thereafter, when the flange portion F has passed through the elastic tongues A, the respective tongues A return to the normal states by their respective restoring forces, and the respective forward ends of the elastic tongues A are pressed against the circumferential surface of the pipe P on the base end side of the flange portion F.

As a result, the pipe P is prevented from being disengaged from the connector through the flange portion F to thereby hold a connecting state between the pipe P and the tube T.

In case the conventional connector is used, as described above, since the pipe P and the tube T can be mutually connected by the insertion operation of the pipe P, the connecting operation can be easily carried out.

Also, in the insertion operation, the insertion force is suddenly changed after the forward ends of the elastic tongues A pass the flange portion F to thereby give an operator a moderate feeling, so that the operator can acknowledge the connecting state between the pipe P and the tube T through the moderate feeling.

However, in the above-described connector, it is necessary that the mounting portion C1 of the connector main portion C is inserted into an opening end portion of the tube T. The insertion operation of the mounting portion C1 requires a great force and is extremely troublesome since the mounting portion C1 is pushed while gradually widening an inner diameter of the tube T.

Moreover, in case the above-described connector is used, it is necessary that not only the connector main portion C and the retainer but also the O-rings 01, 02 and 03 are interposed over the tube T and the pipe P. As a result, the number of parts for connecting the pipe P and the tube T becomes extremely large, which results in a high cost.

In view of the above defects, the present invention has been made, and an object of the invention is to provide a tube which can be connected to a pipe with an easy operation.

Another object of the present invention is to provide a tube as stated above, wherein a production cost can be greatly reduced.

Further objects and advantages of the invention will be apparent from the following description of the invention.

SUMMARY OF THE INVENTION

In order to attain the above objects, according to one aspect of the invention, there is provided a tube to be connected to a pipe including an insertion portion extending from an end surface with an approximately uniform horizontal sectional, and a, projecting portion extending radially outwardly from a circumference thereof and disposed at a position away from the end surface by a predetermined distance.

The tube is integrally formed of a base portion for allowing the insertion portion of the pipe to be inserted therein through an opening at an end surface; a wide portion formed at an open end portion of the base portion to allow the projecting portion of the pipe to be inserted; and a narrow portion projecting inward from an inner surface of the wide portion. The narrow portion is located at a portion closer to an opening side than the projecting portion of the pipe in case the insertion portion of the pipe is inserted into the base portion. In an ordinary state, the narrower portion prevents the projecting portion of the pipe from passing therethrough, and in case the narrower portion is elastically widened, the narrower portion allows the flange portion to pass therethrough.

According to a second aspect of the invention, the narrower portion in the first aspect is formed of a plurality of projections disposed side by side in a circumferential direction.

BRIEF DESCRIPTION OF THE DRAWINGS

FIG. 2(a) is a half sectional view of the whole tube as shown in FIG. 1(a);

FIG. 2(b) is an enlarged side view from a direction of an arrow 2(b) in FIG. 2(a);

FIG. 3(a) is an explanatory view showing molds and an extruder for molding the tube as shown in FIGS. 1(a) and 1(b);

FIG. 3(b) is an explanatory view for showing plural pairs of the molds shown in FIG. 3(a) and disposed side by side;

FIG. 5(a) is a sectional view of an essential part of a conventional connector for connecting a tube and a pipe, in a state before the tube is connected to the pipe; and FIG. 5(b) is a sectional view of an essential part of the conventional connector for connecting the tube and the pipe, in a state after the tube is connected to the pipe.

DETAILED DESCRIPTION OF PREFERRED EMBODIMENTS

Hereunder, the present invention is explained based on the drawings showing embodiments thereof.

Figure 4:
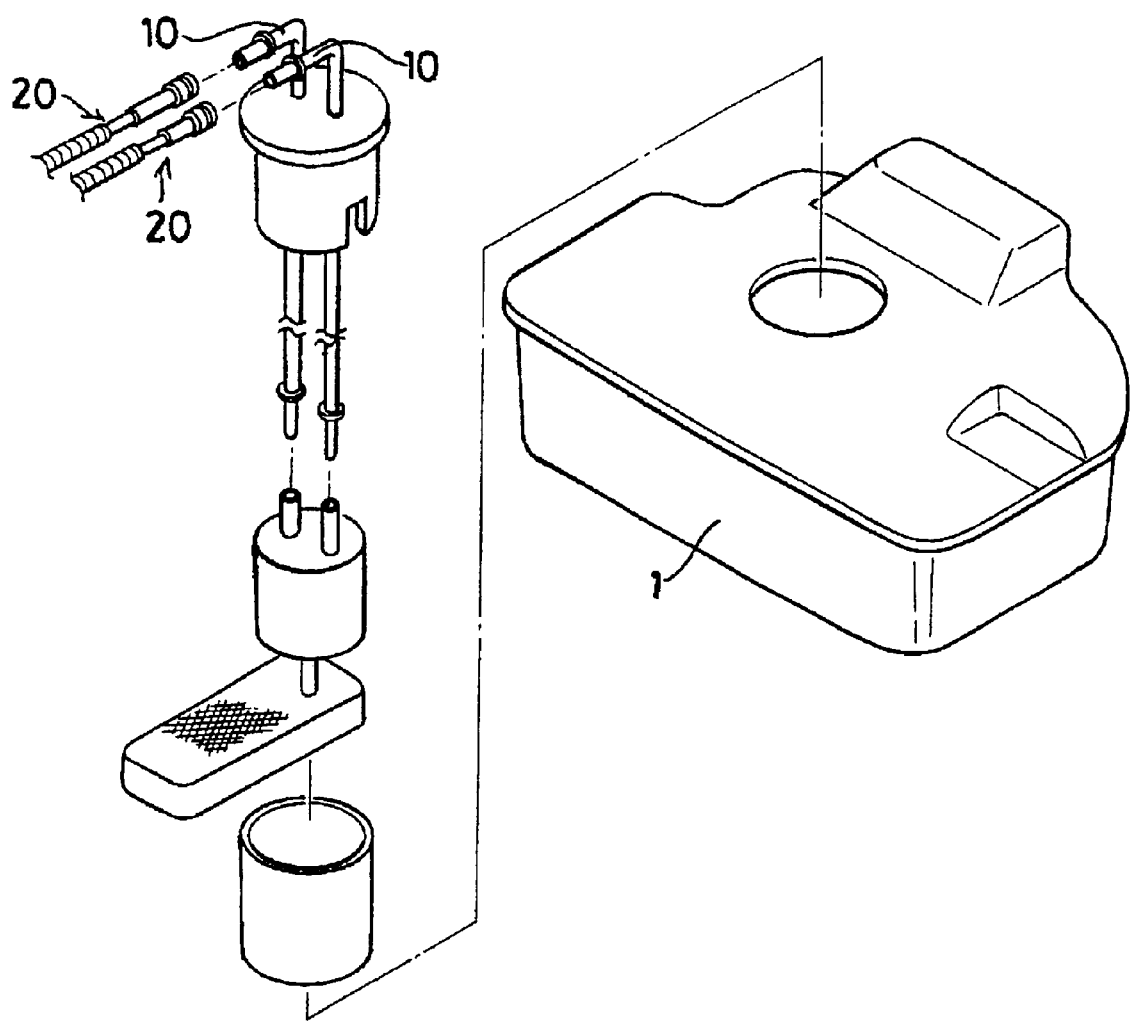
FIG. 4 is an explanatory exploded perspective view for showing an example where the tube as shown in FIGS. 1(a) and 1(b) is applied.

FIGS. 2(a) and 2(b) show an embodiment of a tube according to the present invention, i.e. a tube 20 to be connected to a fuel return pipe 10 of a pump chamber unit in a vehicle fuel supply system provided to a fuel tank 1, as shown in FIG. 4.

Figure 1A:
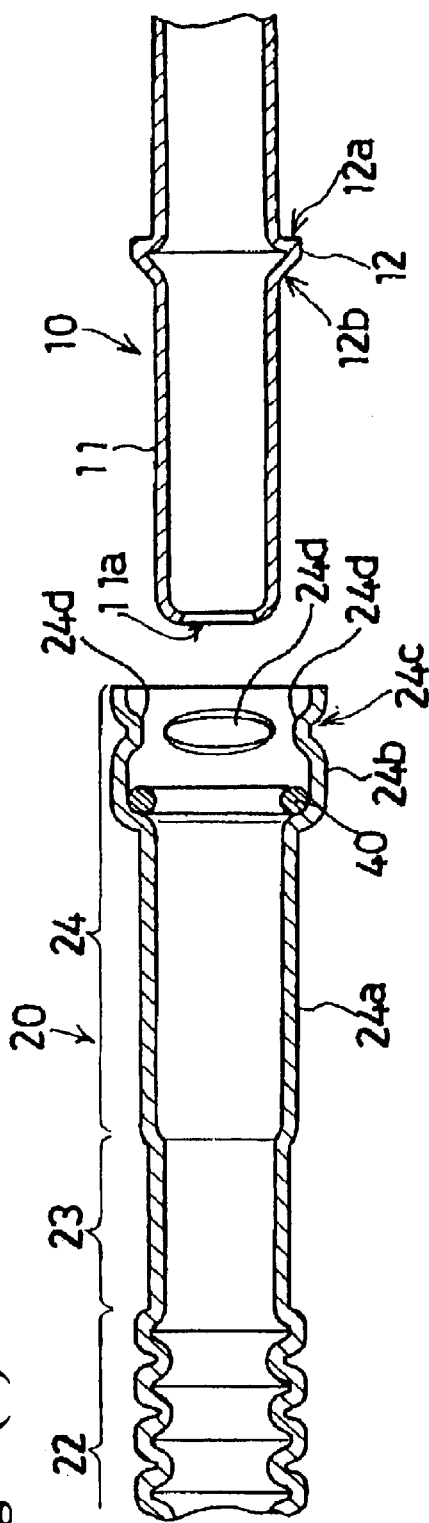
FIG. 1(a) is a sectional view of an essential part of an embodiment of a tube according to the present invention for showing a state before a pipe is inserted into the tube.
Figure 1B:
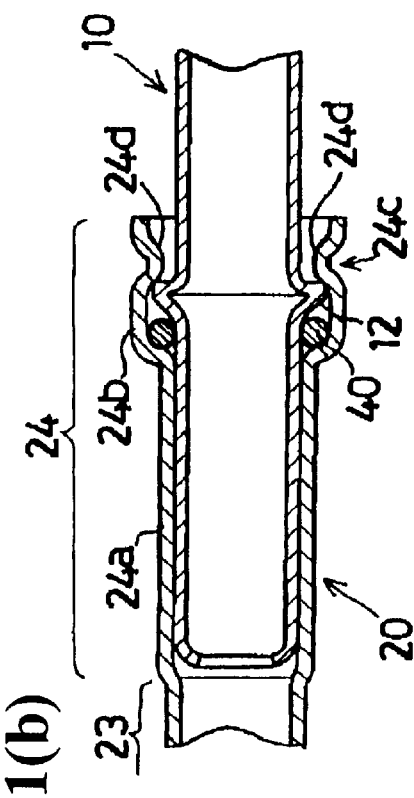
FIG. 1(b) is a sectional view of the essential part of the embodiment of the tube according to the present invention for showing a state after the pipe is connected to the tube.

As shown in FIGS. 1(a) and 1(b), the fuel return pipe 10 to be connected has an insertion end portion 11 to be connected to the tube 20. The insertion end portion 11 has almost the same outer diameter, and is formed of a cylindrical steel member. The insertion end portion 11 has also an annular flange portion 12, i.e. projecting portion, around the whole circumference at a position spaced for a predetermine distance from a forward end surface 11a. As apparent from the drawing, the flange portion 12 has different outer shapes on a base end side and on a forward end side. More specifically, a part of the flange portion 12 positioned on the base end side (hereunder, simply referred to as "flange base end surface 12a") of the fuel return pipe 10 projects perpendicular to an outer circumferential surface of the pipe. On the other hand, a part of the flange portion 12 positioned on the forward end side (hereunder, simply referred to as "flange forward end surface 12b") of the fuel return pipe 10 gradually inclines outwardly from an outer circumferential surface to the base end side of the pipe 10.

Incidentally, in the present embodiment, in case an outer diameter of the fuel return pipe 10 is 8 mm, the flange portion 12 has an outer diameter of 11 mm. Also, the fuel return pipe 10 has a length of 25 mm from the forward end surface 11a to the flange base end surface 12a.

The tube 20 is integrally molded with a synthetic resin, such as 11-nylon (polyundecaneamide) and so on, and includes a first straight tube portion 21, a corrugate portion 22, a second straight tube portion 23 and a connector portion 24. The first straight tube portion 21 is a cylindrical portion having a uniform inner diameter, i.e. of 7 mm, slightly smaller than an outer diameter of the fuel return pipe 10. The corrugate portion 22 has a shape of bellows and a diameter lager than that of the first straight tube portion 21, and can be easily bent. The second straight tube portion 23 has a cylindrical shape of the same inner diameter as that of the first straight tube portion 21. The connector portion 24 is longer than a distance from the forward end surface 11a to the flange base end surface 12a of the fuel return pipe 10, and includes a base portion 24a, a wide portion 24b and a narrow portion 24c.

The base portion 24a has a cylindrical shape having an inner diameter same as the outer diameter of the fuel return pipe 10, i.e. inner diameter of 8 mm. The base portion 24a is slightly shorter than a length from the forward end surface 11a to the flange forward end surface 12b of the fuel return pipe 10.

The wide portion 24b constitutes an insertion port for the fuel return pipe 10, and has an inner diameter larger than the outer diameter of the flange portion 12, concretely 11.8 mm.

The narrow portion 24c is formed of four projections 24d provided on the inner circumferential surface of the wider portion 24b located at the same circular circumference. The projections 24d are disposed with an equal interval therebetween and project inwardly. Also, the projections 24d have spaces between mutually facing portions, i.e. 9.6 mm, larger than the outer diameter of the fuel return pipe 10 and smaller than the outer diameter of the flange portion 12. The narrower portion 24c is formed such that in, case the fuel return pipe 10 is inserted into the deepest portion of the base portion 24a (refer to FIG. 1(b)), it is located at art opening side, relative to the side of the flange base end surface 12a, at the inner circumferential surface of the wide portion 24b. Also, when the respective projections 24d for constituting the narrow portion 24c are pressed radially outwardly, they can be elastically bent in that direction easily.

The tube 20 can be molded by various molding methods, such as an extrusion molding method and a blow molding method. For example, in the present embodiment, as shown in FIG. 3(a), the tube 20 is molded by using a continuous extruder 30 for extruding a hollow portion.

The continuous extruder 30 includes plural pairs of single molds 31a, 31b, . . . , 31n, and a pair of transferring mechanisms 32R, 32L for transferring the pairs of the single molds 31a, 31b, 31n. As shown in FIG. 3(b), in case the plural pairs of the single molds 31a, 31b, . . . , 31n are sequentially disposed side by side, there is constituted a series of cavities 33 corresponding to the first straight tube portion 21, corrugate portion 22, second straight tube portion 23 and connector portion 24 of the tube 20. The respective pairs of the single molds 31a, 31b, . . . , 31n can be divided into two parts to cut the series of the cavities 33 in half. The transferring mechanisms 32R, 32L independently circulate the respective single molds 31a, 31b, . . . , 31n in the state divided on the upper side and the lower side by a suitable transferring device, such as a chain and belt, as shown in FIG. 3(a), and the respective series of the single molds 31a, 31b, . . . , 31n are held in a contact state at a predetermined molding portion 34.

In the continuous extruder 30, a molten resin is sequentially supplied from an extruder 35 between the respective series of the single molds 31a, 31b, . . . , 31n mutually joined at the molding portion 34 to be adsorbed along the inner circumferential surfaces of the respective single molds 31a, 31b, . . . , 31n, so that the tubes 20 of different shapes can be continuously molded in an axial direction.

In case the fuel return pipe 10 is connected to the tube 20 thus structured, first, as shown in FIG. 1(a), an O-ring 40, as a sealing member, having a smaller inner diameter than the outer diameter of the fuel return pipe 10 is disposed in the wide portion 24b of the connector portion 24 of the tube 20. In this case, it is necessary to use the O-ring 40 having an outer diameter slightly larger than the inner diameter of the wider portion 24b. Since the O-ring 40 can be easily deformed, in case the O-ring 40 is disposed in the wide portion 24b, especially, to pass through the narrow portion 24c, no troublesome operation is required. Incidentally, in the present embodiment, the O-ring 40 made of a material having a sufficient resistance with respect to a fuel like gasoline, for example, a fluoro-rubber is used.

Then, the fuel return pipe 10 is inserted from the forward end side thereof through the opening of the wide portion 24b.

When the fuel return pipe 10 is inserted into the tube 20 and the flange portion 12 reaches the narrow portion 24c, the respective projections 24d for constituting the narrow portion 24c are sequentially pressed radially outwardly by the inclination of the flange forward end surface 12b to thereby elastically deform, respectively. As a result, the spaces formed among the respective projections 24d at the narrow portion 24c are enlarged to allow the flange portion 12 of the fuel return pipe 10 to pass therethrough.

When the flange portion 12 of the fuel return pipe 10 has passed through the narrow portion 24c of the tube 20, as shown in FIG. 1(b), the plural projections 24d for constituting the narrow portion 24c return to the ordinary state, respectively, to again form the spaces, among the respective projections 24d, which are larger than the outer diameter of the fuel return pipe 10 and smaller than the outer diameter of the flange portion 12.

Thus, a movement in a disengaging direction of the fuel return pipe 10 with respect to the tube 20 is prevented by the flange base end surface 12a of the fuel return pipe 10 abutting against the projections 24d, so that the tube 20 and the fuel return pipe 10 are held in a connected state. In this state, since the O-ring 40 disposed at the wide portion 24b is tightly pressed between an outer circumferential surface of the fuel return pipe 10 and an inner circumferential surface of the wide portion 24b to obtain a sufficient sealing ability therebetween, there is no risk of leaking of a fuel.

As described above, since the tube 20 can be attached by only inserting the fuel return pipe 10 thereinto, an attaching operation of the tube 20 can be extremely easily carried out.

Furthermore, the respective elements, i.e. the base portion 24a, wide portion 24b and narrow portion 24c, for constituting the connector portion 24 acting as a connector with respect to the fuel return pipe 10 are integrally molded, and at the same time, the connector portion 24 is also integrally molded with the first straight tube portion 21, the corrugate portion 22 and the second straight tube portion 23. Thus, the tube of the invention does not require any preparation in advance as in the conventional tube to thereby easily carry out the whole connecting operation, reduce the number of parts required for connecting the fuel return pipe 10, and lower the cost.

Also, an insertion operation force is suddenly changed after the flange portion 12 passes through the respective projections 24d at the narrow portion 24c to give an operator a moderate feeling so that the operator can recognize its connecting state between the fuel return pipe 10 and the tube 20.

Incidentally, in the above embodiment, although the tube 20 to be connected to the fuel return pipe 10 of the pump chamber unit in the vehicle fuel supply system is exemplified, the tube of the invention can also be applied to any tube to be connected to a pipe having a projecting portion on an outer surface of an insertion end portion. In this case, the tube does not necessarily have the corrugate portion. Also, the pipe to be connected does not necessarily have a circular cylinder, and for example, a pipe having a square pillar shape may be connected to the tube.

Also, in the above embodiment, although the narrow portion 24c is constituted by four projections 24d, a plurality of the projections other than four projections may constitute the narrow portion, or only one annular projection may constitute the narrow portion. Incidentally, in case the annular projection constitutes the narrow portion, the projecting portion of the pipe to be connected does not necessarily have an annular shape.

As explained above, according to the present invention, the wide portion and the narrow portion are integrally molded to an opening end portion of the base portion of the tube to provide a connector function with respect to the pipe. Therefore, it is not required to attach the connector in advance to thereby simplify the connecting work of the pipe and, at the same time, to extremely reduce the number of parts, which results in reducing the cost. Also, since the projecting portions of the pipe provide the moderate feeling to the operator when the projecting portions pass through the narrow portions of the tube, the operator can recognize the connecting state with the pipe.

While the invention has been explained with reference to the specific embodiments of the invention, the explanation is illustrative and the invention is limited only by the appended claims.

What is claimed is:

1. A tube to be connected to a pipe having an insertion portion and a projecting portion extending radially outwardly from an outer circumference of the pipe, said tube comprising:

a base portion for receiving therein the insertion portion of the pipe, said base portion having a smooth inner surface extending in an axial direction for a predetermined distance to contact the insertion portion of the pipe, a wide portion integrally formed with the base portion at one side thereof, said wide portion having an inner end extending radially outwardly from the base portion, an opening formed at a side opposite to the inner end and an inner diameter greater than that of the base portion, said wide portion receiving the projecting portion of the pipe therein when the pipe is inserted, a narrow portion integrally formed with the wide portion to project inwardly from an inner circumference of the wide portion and located at a position away from the inner end, the thickness of the tube for forming the narrow portion being substantially same as that of the wide portion, said narrow portion being deformable and having a plurality of inward projections disposed side by side in a circumferential direction with a space between two of the inward projections, said inward Projections being formed between the inner end and the opening so that the narrower portion allows the projecting portion to pass therethrough in a pipe inserting direction by deformation thereof, and prevents the projecting portion from passing therethrough in a pipe removing direction opposite to the pipe inserting direction, and an O-ring situated adjacent to the inner end to seal the tube relative to the pipe.

2. A tube according to claim 1, wherein each of said inward projections has an inner surface extending circularly.

3. A tube according to claim 1, wherein said tube is formed of a deformable resin by molding and includes a tube main portion.

4. A tube according to claim 1, further comprising a straight portion integrally connected to the base portion at a side opposite to the wide portion and having an inner diameter smaller than that of the base portion, said straight portion, base portion, wide portion and narrow portion being integrally formed together with substantially same thicknesses.

5. A tube according to claim 4, wherein said wide portion has an axial length between the inner end and the narrow portion such that when the pipe is fully inserted into the tube, the O-ring is located outside of the pipe and is sandwiched between the inner end and the narrow portion to securely seal between the pipe and the tube.

6. A tube according to claim 5, further comprising a corrugated portion integrally connected to the straight portion, and another straight portion integrally connected to the corrugated portion to thereby form an elongated tube.

7. A tube according to claims 5, wherein said base portion and wide portions have cylindrical shapes integrally formed together, said base portion substantially entirely contacting the insertion portion.

* * * * *